(12) United States Patent
Han

(10) Patent No.: US 10,940,390 B2
(45) Date of Patent: Mar. 9, 2021

(54) AUDIO INFORMATION PROCESSING METHOD

(71) Applicant: Tai-Sheng Han, New Taipei (TW)

(72) Inventor: Tai-Sheng Han, New Taipei (TW)

(73) Assignee: EVGA CORPORATION, New Taipei (TW)

(*) Notice: Subject to any disclaimer, the term of this patent is extended or adjusted under 35 U.S.C. 154(b) by 225 days.

(21) Appl. No.: 16/282,246

(22) Filed: Feb. 21, 2019

(65) Prior Publication Data
US 2020/0269134 A1    Aug. 27, 2020

(51) Int. Cl.
| | | |
|---|---|---|
| *A63F 13/422* | (2014.01) | |
| *G06F 3/16* | (2006.01) | |
| *A63F 13/25* | (2014.01) | |
| *A63F 13/54* | (2014.01) | |
| *A63F 13/24* | (2014.01) | |
| *A63F 13/215* | (2014.01) | |
| *H05B 47/12* | (2020.01) | |

(52) U.S. Cl.
CPC .......... *A63F 13/422* (2014.09); *A63F 13/215* (2014.09); *A63F 13/24* (2014.09); *A63F 13/25* (2014.09); *A63F 13/54* (2014.09); *G06F 3/165* (2013.01); *H05B 47/12* (2020.01); *A63F 2300/6072* (2013.01); *A63F 2300/6081* (2013.01)

(58) Field of Classification Search
CPC ......... A61N 5/06; A63F 13/28; A63F 13/422; G07F 17/3204; G07F 17/3211; G06F 16/48

See application file for complete search history.

(56) References Cited

U.S. PATENT DOCUMENTS

| | | | | |
|---|---|---|---|---|
| 6,577,080 B2* | 6/2003 | Lys | ............................ | F21S 4/28 |
| | | | | 315/362 |
| 7,015,825 B2* | 3/2006 | Callahan | .................... | G09F 9/33 |
| | | | | 340/815.45 |
| 8,796,951 B2* | 8/2014 | Feri | ......................... | H05B 47/19 |
| | | | | 315/295 |
| 10,653,951 B2* | 5/2020 | Aliakseyeu | ........... | H05B 47/155 |
| 2004/0156192 A1* | 8/2004 | Kerr | ........................ | H05B 47/10 |
| | | | | 362/154 |
| 2004/0212320 A1* | 10/2004 | Dowling | ................. | H04S 5/005 |
| | | | | 315/291 |

(Continued)

*Primary Examiner* — Reginald A Renwick
(74) *Attorney, Agent, or Firm* — Che-Yang Chen; Law Office of Michael Chen

(57) ABSTRACT

An audio information processing method, comprising: providing a computer device having a sound effect processing unit, and the computer device being further disposed with a sound effect generating unit and a signal connection interface; the sound effect generating unit receiving an audio information and generating a sound effect signal and transmitting the signal to the sound effect processing unit; the sound effect processing unit analyzing the sound effect signal and generating a position identification signal and transmitting the signal to the signal connection interface; the signal connection interface transmitting the position identification signal to a control circuit of a peripheral device; and the control circuit having a processing unit for processing the position identification signal and generating at least one control signal and controlling at least one light-emitting unit to generate a light source.

7 Claims, 16 Drawing Sheets

(56) References Cited

U.S. PATENT DOCUMENTS

| | | | | |
|---|---|---|---|---|
| 2005/0116667 A1* | 6/2005 | Mueller | ............... | G09F 19/22 |
| | | | | 315/312 |
| 2013/0278631 A1* | 10/2013 | Border | ............... | G02C 5/143 |
| | | | | 345/633 |
| 2014/0100030 A1* | 4/2014 | Burke | ............... | G07F 17/3204 |
| | | | | 463/31 |
| 2014/0354153 A1* | 12/2014 | Pulido, Jr. | ............... | B60Q 3/80 |
| | | | | 315/77 |
| 2015/0348330 A1* | 12/2015 | Balachandreswaran | ............... | |
| | | | | A63F 13/285 |
| | | | | 463/5 |
| 2016/0093278 A1* | 3/2016 | Esparza | ............... | G10H 3/12 |
| | | | | 84/615 |
| 2019/0132928 A1* | 5/2019 | Rodinger | ............... | F21V 21/005 |

\* cited by examiner

AUDIO INFORMATION PROCESSING METHOD

BACKGROUND OF THE INVENTION

Field of Invention

The present invention relates to an audio information processing method, and more particularly to an audio information processing method for analyzing an audio information to obtain a position signal and displaying it by a light source to quickly identify an orientation in a computer game.

Related Art

With the development of computers and the continuous upgrading of computer software, playing computer games with computer is one of the most indispensable entertainments. The development of computer games is becoming more and more exquisite, and with high quality whether it is visual effects or sound effects, can almost simulate real people or environment. The most exciting thing about computer games is the competition between players, thus many professional gamers will wear earphones and microphone and control the game with mouse and keyboard, and interact with other players with microphone. In the game, it is more important to judge the position of enemy by the direction of sound generated by the earphones. However, due to the various noises in the surrounding environment of the player, and the volume of noise emitted when clicking the mouse and mechanical keyboard can not be ignored, or the dialogue between teammates will affect the possibility of judging the position. Therefore, some manufacturers have introduced plug-in warning software to load a map on the screen desktop, and the map will show the orientation of the enemy, and the player will identify the enemy's position with the loaded map display. However, plug-ins are often unacceptable and prohibited by game companies, even more serious, they even block accounts, so users can't load their plug-in warning software, and they can't clearly identify the orientation of enemy's attack in the game.

Therefore, how to solve the above problems and drawbacks in the prior art is what the inventor of the present invention and relevant manufacturers engaged in this industry are eager to research and make improvement.

SUMMARY OF THE INVENTION

Therefore, in order to effectively solve the above problems, a main object of the present invention is to provide an audio information processing method for analyzing an audio information to obtain a position signal and displaying it by a light source to quickly identify the orientation in a computer game.

In order to achieve the above object, the present invention provides an audio information processing method, the method comprising: providing a computer device having a sound effect processing unit, and the computer device being further disposed with a sound effect generating unit and a signal connection interface; the sound effect generating unit receiving an audio information and generating a sound effect signal and transmitting the signal to the sound effect processing unit; the sound effect processing unit analyzing the sound effect signal and generating a position identification signal and transmitting the signal to the signal connection interface; the signal connection interface transmitting the position identification signal to a control circuit of a peripheral device; and the control circuit having a processing unit for processing the position identification signal and generating at least one control signal and controlling at least one light-emitting unit to generate a light source. Thereby, when a user plays a computer game, the light-emitting unit of the peripheral device illuminates correspondingly according to the direction of sound in the game, thus achieving the effect of quickly identifying the orientation by the user through the display of the light source.

According to an embodiment of the audio information processing method of the present invention, wherein the computer device has at least one game software therein, and the computer device executes the game software to generate the audio information.

According to an embodiment of the audio information processing method of the present invention, wherein the peripheral device further has a signal transmission interface, the signal transmission interface is electrically connected to the control circuit, and the control circuit is electrically connected to the signal connection interface via the signal transmission interface.

According to an embodiment of the audio information processing method of the present invention, wherein the signal connection interface is a wired interface of the universal serial bus (USB), and the signal transmission interface is a wired interface of a USB transmission line.

According to an embodiment of the audio information processing method of the present invention, wherein the signal transmission interface and the signal connection interface are wireless interfaces of Wi-Fi, Bluetooth, infrared antenna or other transmission protocols.

According to an embodiment of the audio information processing method of the present invention, wherein the peripheral device is a keyboard, a mouse or a game controller.

According to an embodiment of the audio information processing method of the present invention, further comprising a step of: generating an illumination area by the light source.

DETAILED DESCRIPTION OF THE INVENTION

Figure 1:
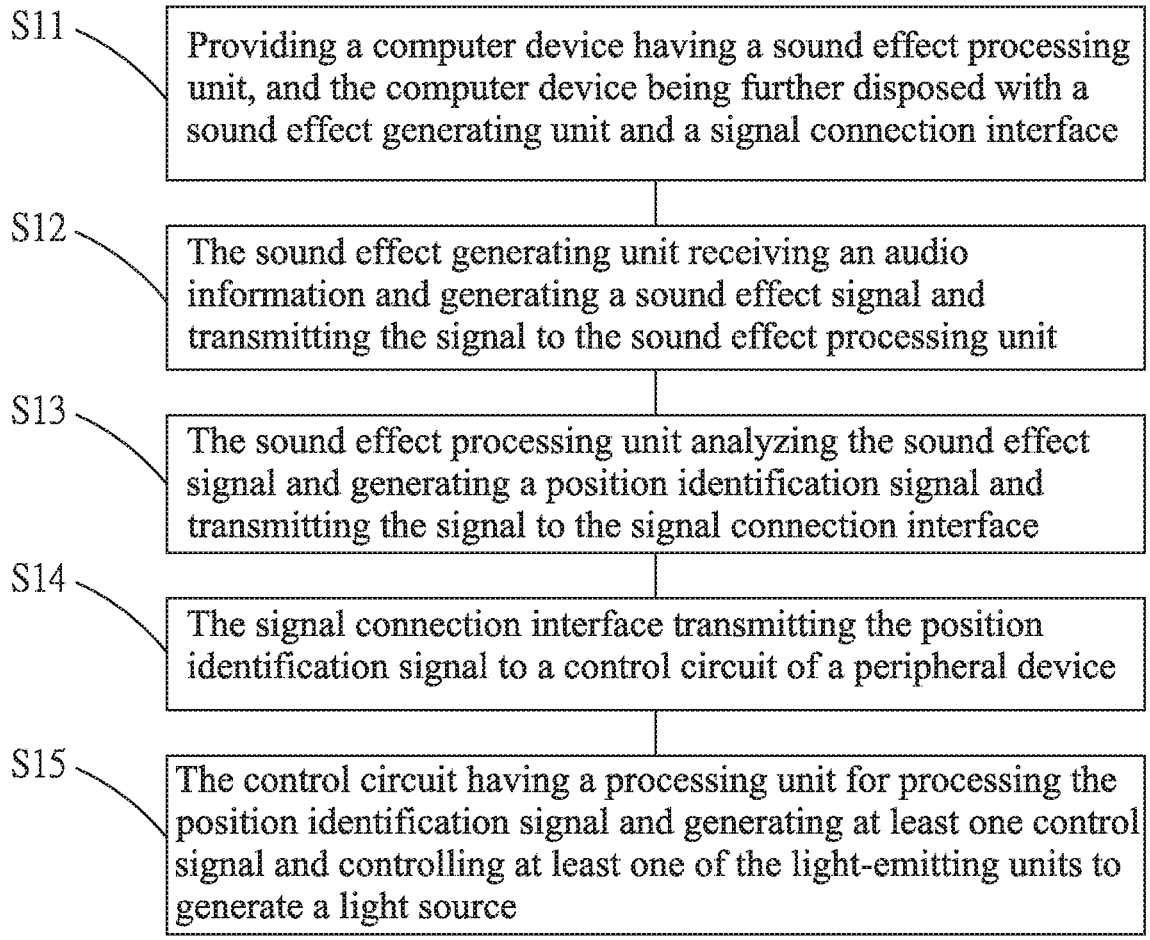
FIG. 1 is a first flow chart of an audio information processing method of the present invention.
Figure 2:
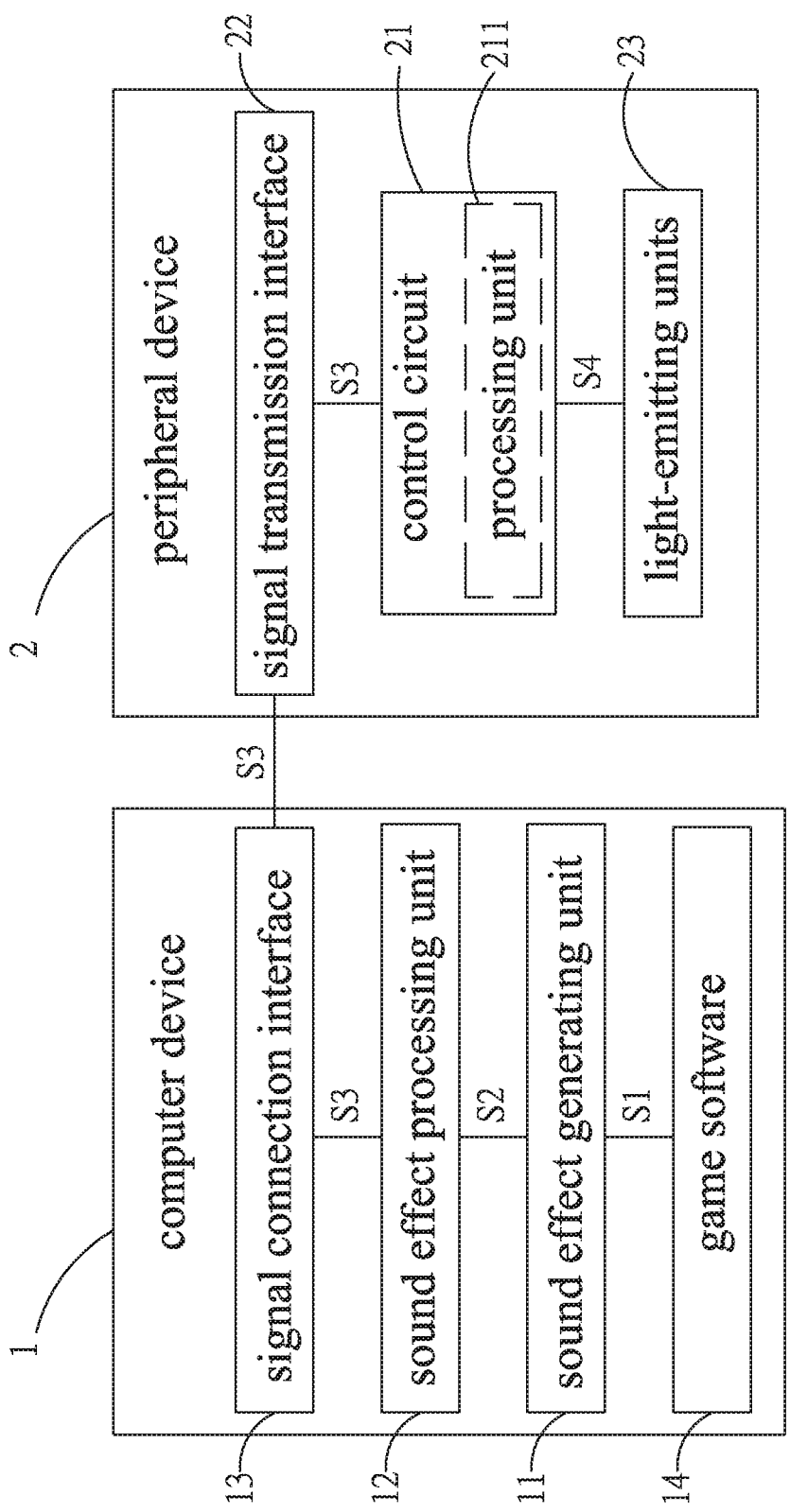
FIG. 2 is a block diagram of the audio information processing method of the present invention.

Please refer to FIG. 1 and FIG. 2, which are flowchart and block diagram of an audio information processing method of the present invention. It can be clearly seen from the figures that, the audio information processing method comprising:

step S11: providing a computer device having a sound effect processing unit, and the computer device being further disposed with a sound effect generating unit and a signal connection interface; firstly, providing a computer device 1, and the computer device 1 being disposed with a sound effect generating unit 11, a sound effect processing unit 12 and a signal connection interface 13; wherein the sound effect generating unit 11 is an AUD sound card, the sound effect generating unit 11 is electrically connected to the sound effect processing unit 12, and the sound effect processing unit 12 is electrically connected to the signal connection interface 13; the signal connection interface 13 can be a wired interface of the universal serial bus (USB), or can be a wireless interface of Wi-Fi, Bluetooth, infrared antenna or other transmission protocols, and in the computer device 1 is installed with at least one game software 14;

step S12: the sound effect generating unit 11 receiving an audio information and generating a sound effect signal and transmitting the signal to the sound effect processing unit 12; when a user executing the game software 14, the game software 14 generating at least one audio information S1; wherein the sound information S1 includes moving sound and orientation of an enemy in a game map, the sound effect generating unit 11 receives the audio information S1, the sound effect generating unit 11 generates one sound effect signal S2 via the audio information S1, and the sound effect generating unit 11 transmits the sound effect signal S2 to the sound effect processing unit 12;

step S13: the sound effect processing unit 12 analyzing the sound effect signal S2 and generating a position identification signal S3 and transmitting the signal to the signal connection interface 13; wherein the sound effect processing unit 12 receives the sound effect signal S2, and the sound processing unit 12 analyzes a sound position in the sound effect signal S2 and generates a position identification signal S3, and transmits the position identification signal S3 to the signal connection interface 13;

step S14: the signal connection interface 13 transmitting the position identification signal S3 to a control circuit of a peripheral device; and further providing a peripheral device 2, the peripheral device 2 being disposed with a control circuit 21, a signal transmission interface 22 and a plurality of light-emitting units 23; wherein the control circuit 21 is electrically connected to the signal transmission interface 22, and the control circuit 21 is electrically connected to the signal connection interface 13 via the signal transmission interface 22, a transmission mode of the signal transmission interface 22 corresponds to the signal connection interface 13, the signal transmission interface 22 is a wired interface of a USB transmission line, or can be a wireless interface of Wi-Fi, Bluetooth, infrared antenna or other transmission protocols, and the peripheral device 2 is a keyboard, a mouse or a game controller, in this embodiment, the keyboard is mainly used as the implementation, but it is not limited thereto; wherein the signal connection interface 13 transmits the position identification signal S3 to the signal transmission interface 22 in a wired or wireless manner, and the signal transmission interface 22 transmits the position identification signal S3 to the control circuit 21;

step S15: the control circuit 21 having a processing unit for processing the position identification signal S3 and generating at least one control signal and controlling at least one of the light-emitting units 23 to generate a light source; the control circuit 21 having a processing unit 211, and the control circuit 21 receiving the position identification signal S3 via the processing unit 211 and generating at least one control signal S4, and the control signal S4 turning on the corresponding light-emitting unit 23 according to a direction of sound and identifying. Thereby, when the user plays a computer game, the light-emitting unit 23 of the peripheral device 2 illuminates correspondingly according to the direction of sound in the game, thus achieving the effect of quickly identifying the orientation by the user through the display of the light source.

Figure 3:
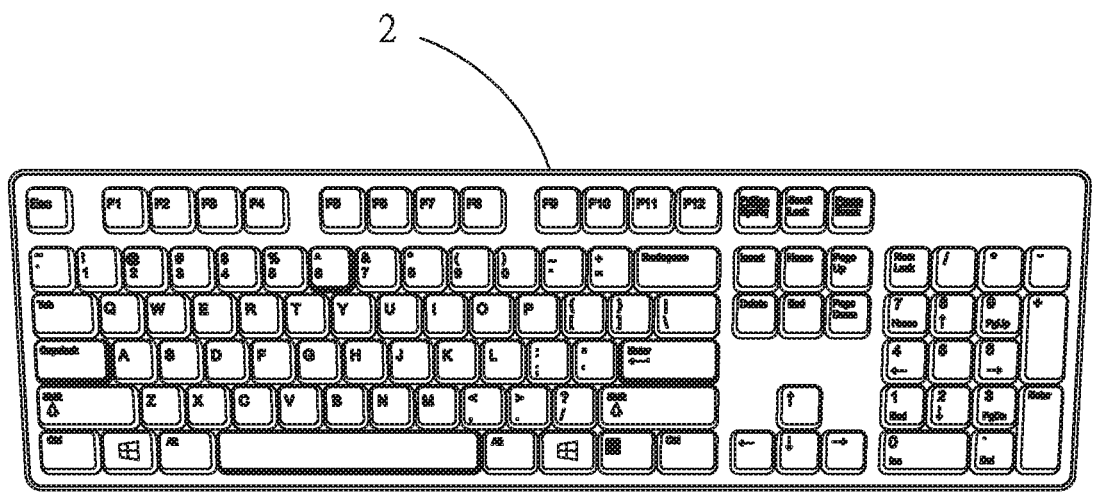
FIG. 3 is a first schematic diagram of the implementation of the audio information processing method of the present invention.
Figure 4:
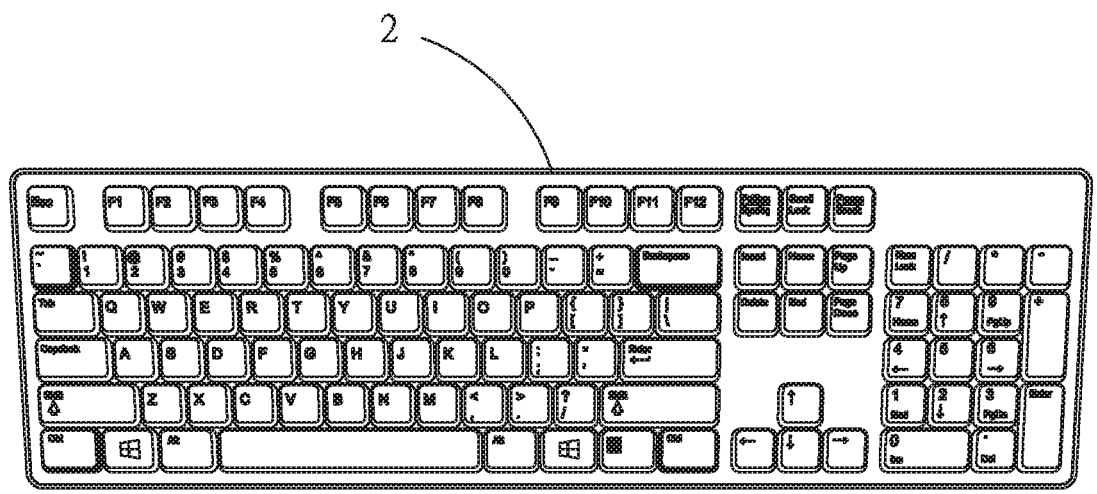
FIG. 4 is a second schematic diagram of the implementation of the audio information processing method of the present invention.

Referring to the foregoing drawings and FIGS. 3 and 4, which are first and second schematic diagrams of the implementation of the audio information processing method of the present invention. The peripheral device 2 is implemented by using a keyboard, and the light-emitting units 23 are disposed under the keyboard keys, and the keyboard keys are light-transmissive structures or light-transmissive structures between the keyboard and the keys. Positions of the keyboard are distinguished by areas of orientation, and at least one of the keys is defined as a representative in each of the areas. In this embodiment, the keyboard is divided into eight areas, mainly the front, rear, left, right, front left, rear left, front right, and rear right, wherein the upper horizontal key number 6 as the front orientation, the blank key as the rear orientation, the Caps Lock key as the left orientation, the Enter key as the right orientation, the upper horizontal "~" key as the front left orientation, the lower left Ctrl key as the rear left orientation, the Backspace key as the front right orientation, and the lower right Ctrl key as the rear right orientation. The position identification signal S3 received by the processing unit 211 generates the control signal S4 according to the enemy's orientation. If the enemy's orientation is in front of the user, the light-emitting unit 23 of the upper horizontal number 7 will be correspondingly lit or blinked; on the contrary, if the enemy's orientation is at the left of the user, the light-emitting unit 23 of the Caps Lock key will be correspondingly lit or blinked; or if the enemy's orientation is behind the user, the light-emitting unit 23 of the blank key will be correspondingly lit or blinked; if the enemy's orientation is at the right of the user, the light-emitting unit 23 of the Enter key will be correspondingly lit or blinked, and so on. If the enemy's orientation is in the user's orientation, the distinguished corresponding key will be lit or blinked, thus achieving the effect of quickly identifying the enemy's orientation by the user through the display of the light source, and the defined keys are not limited thereto, and any methods for distinguishing the orientations by mainly using the positions of the keyboard are within the scope protected by the present invention.

Figure 5:
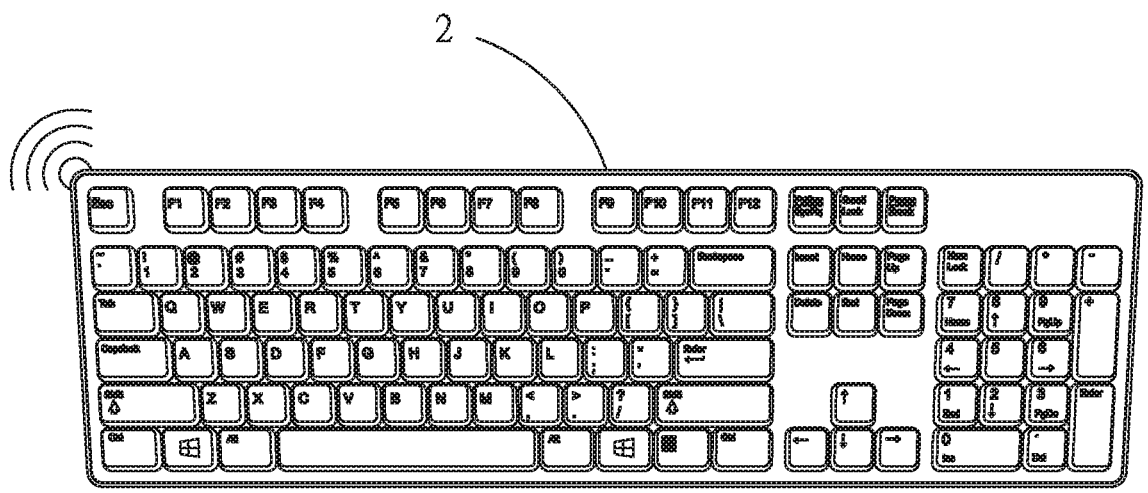
FIG. 5 is a third schematic diagram of the implementation of the audio information processing method of the present invention.
Figure 6:
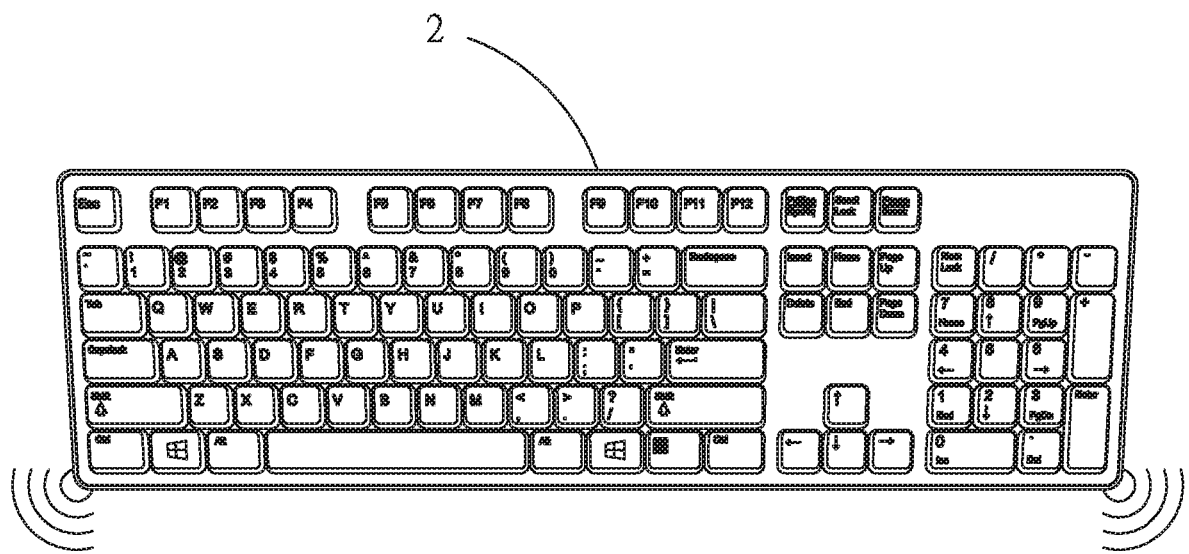
FIG. 6 is a fourth schematic diagram of the implementation of the audio information processing method of the present invention.
Figure 7:
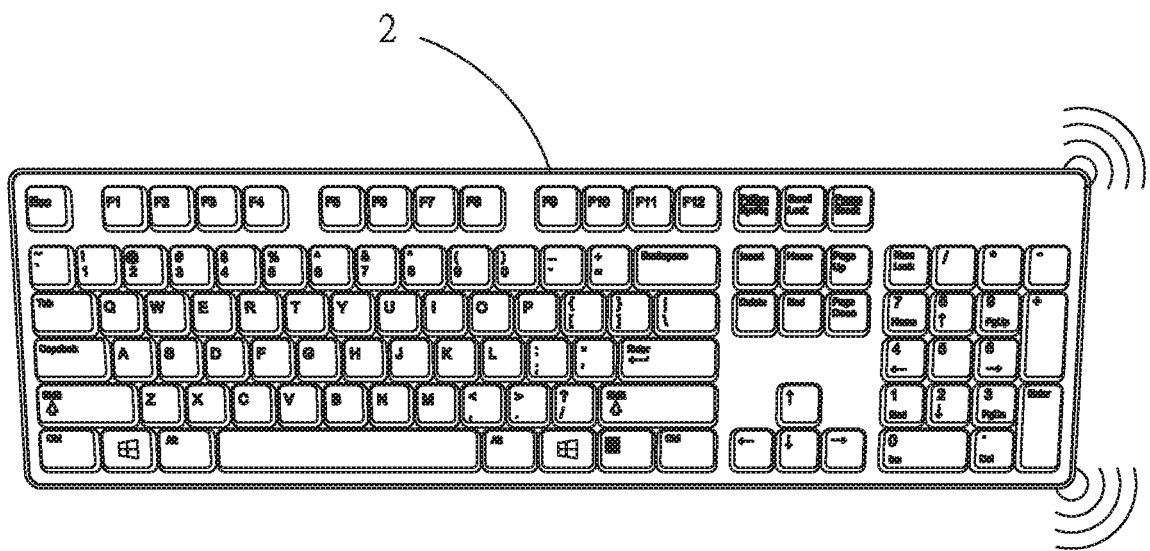
FIG. 7 is a fifth schematic diagram of the implementation of the audio information processing method of the present invention.
Figure 8:
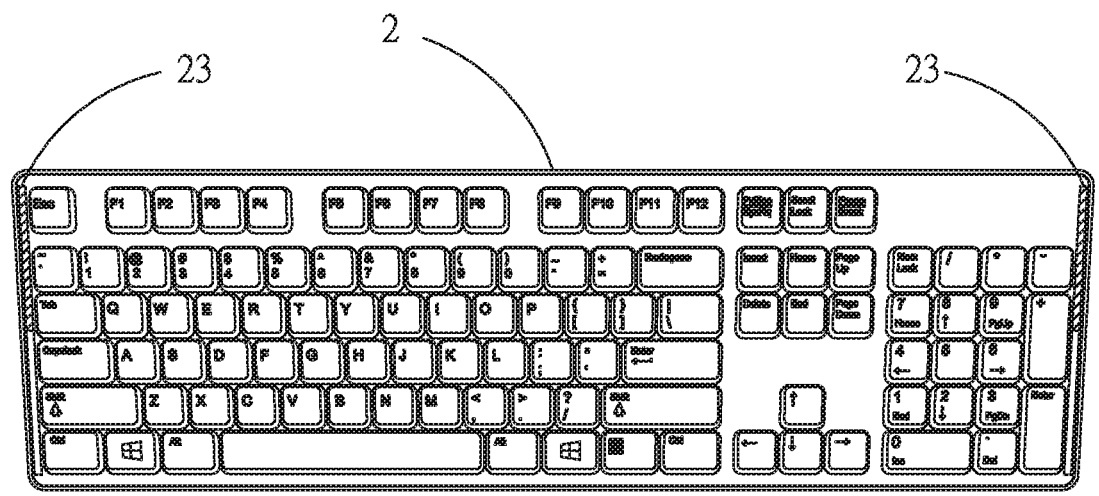
FIG. 8 is a sixth schematic diagram of the implementation of the audio information processing method of the present invention.
Figure 9:
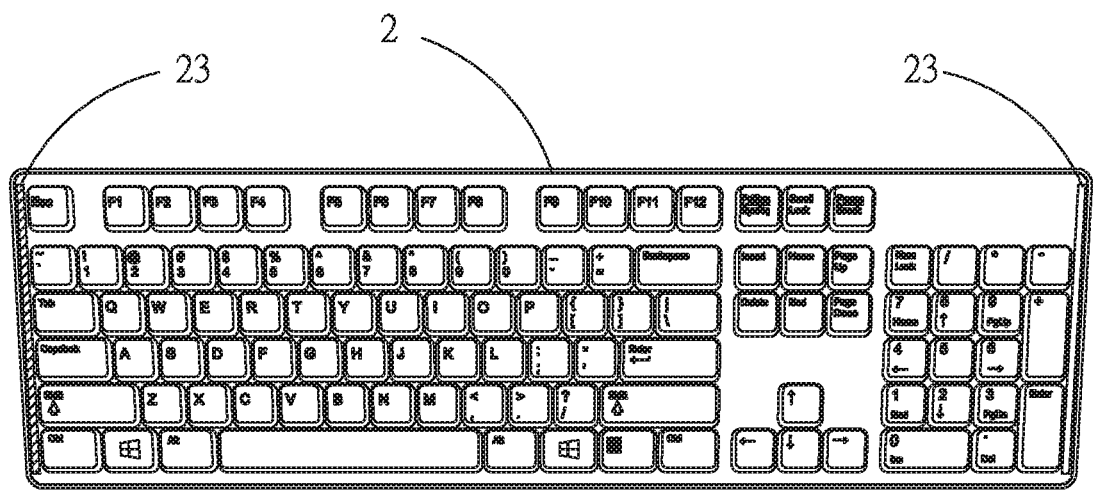
FIG. 9 is a seventh schematic diagram of the implementation of the audio information processing method of the present invention.
Figure 10:
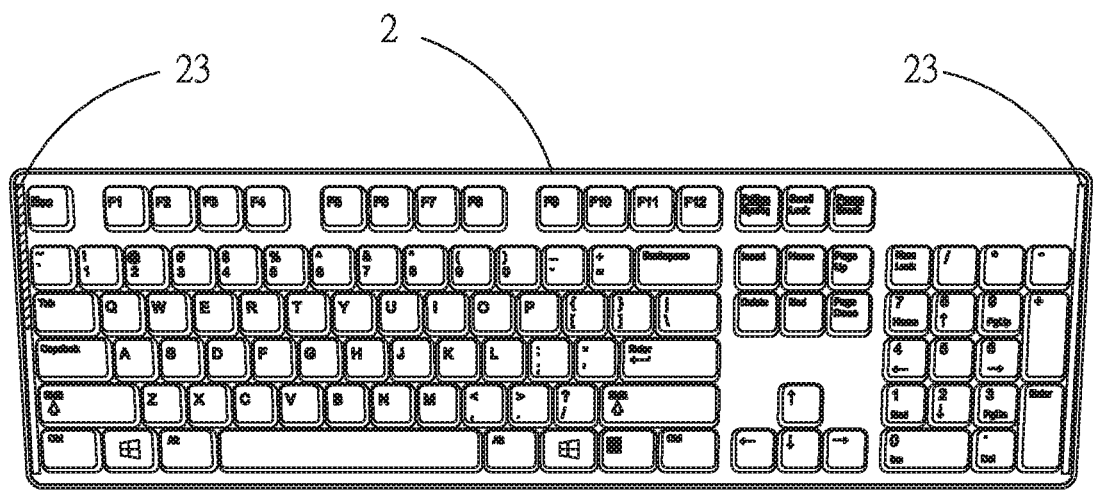
FIG. 10 is an eighth schematic diagram of the implementation of the audio information processing method of the present invention.
Figure 11:
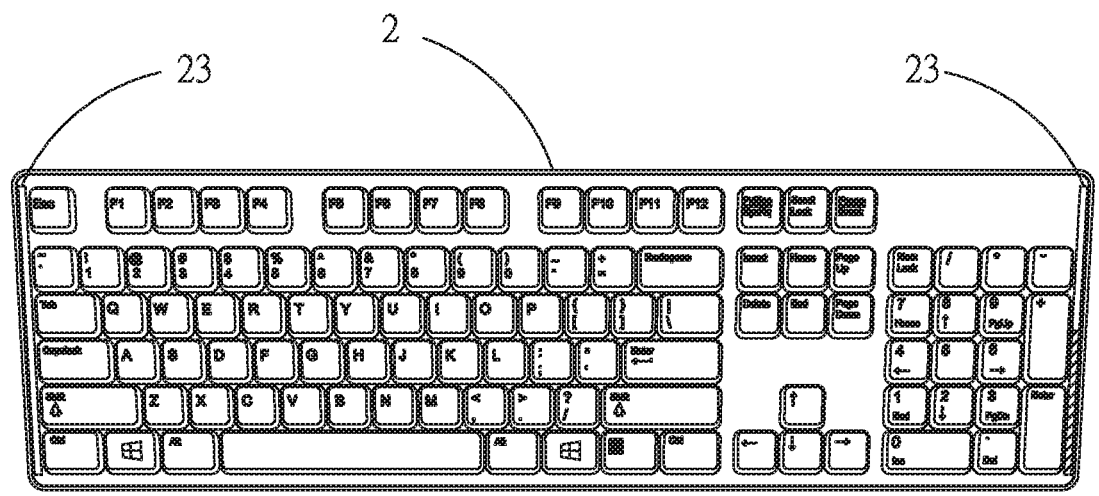
FIG. 11 is a ninth schematic diagram showing the implementation of the audio information processing method of the present invention.

Referring to the foregoing drawings and FIGS. 5 and 6 and 7, which are third to fifth schematic diagrams of the implementation of the audio information processing method of the present invention. The peripheral device 2 is implemented by using a keyboard. The light-emitting units 23 are disposed at four corners of the keyboard, and are respectively disposed at the upper left end, the lower left end, the upper right end, and the lower right end of the keyboard. The light-emitting units 23 can be disposed at upper positions or on the sides or at lower positions of the keyboard. The position identification signal S3 received by the processing unit 211 generates the control signal S4 according to the enemy's orientation. If the enemy's orientation is at the front left or rear left or front right or rear right of the user, the light-emitting units 23 at the upper left end and the lower left end and the upper right end and the lower right end of the keyboard will be correspondingly lit or blinked. In the figure, the front left is implemented as the embodiment, if the enemy's position is at the left of the user, the light-emitting units 23 at the upper left end and the lower left end of the keyboard will be correspondingly lit or blinked. If the enemy's orientation is behind the user, the light-emitting units 23 at the lower left end and the lower right end of the keyboard will be correspondingly lit or blinked. If the enemy's orientation is at the right of the user, the light-emitting units 23 at the upper right end and the lower right end of the keyboard will be correspondingly lit or blinked. In the figure, the rear and left are implemented as the embodiment, and so on. If the enemy's orientation is in the user's orientation, the distinguished corresponding key will be lit or blinked, thus achieving the effect of quickly identifying the enemy's orientation by the user through the display of the light source, and the defined keys are not limited thereto, and any methods for distinguishing the orientations by mainly using the positions of the keyboard are within the scope protected by the present invention.

Referring to the foregoing drawings and FIGS. 8 and 9 and 10 and 11, which are sixth to ninth schematic diagrams of the implementation of the audio information processing method of the present invention. The peripheral device 2 is implemented by using a keyboard. The light-emitting units 23 are disposed at positions on an upper surface of the keyboard, and the light-emitting units 23 are on the left and right sides of the keyboard and are implemented by light strips. The light strips can be lit from top to bottom. The position identification signal S3 received by the processing unit 211 generates the control signal S4 according to the enemy's orientation. If the enemy's orientation is in front of the user, upper half parts of the light strips on the left and right sides are lit. If the enemy's orientation is behind the user, lower half parts of the light strips on the left and right sides are lit. If the enemy's orientation is at the left of the user, the left light strip is fully lit. If the enemy's orientation is at the right of the user, the right light strip is fully lit. If the enemy's orientation is at the front left of the user, the upper half part of the left light strip is lit. If the enemy's orientation is at the rear left of the user, the lower half part of the left light strip is lit. If the enemy's orientation is at the front right of the user, the upper half part of the right light strip is lit. If the enemy's orientation is at the rear right of the user, the lower half part of the right light strip is lit. In the figures, the front, left, front left, and rear right are implemented as the embodiments, and so on. If the enemy's orientation is in the user's orientation, the distinguished corresponding key will be lit or blinked, thus achieving the effect of quickly identifying the enemy's orientation by the user through the display of the light source, and the defined keys are not limited thereto, and any methods for distinguishing the orientations by mainly using the positions of the keyboard are within the scope protected by the present invention.

Figure 12:
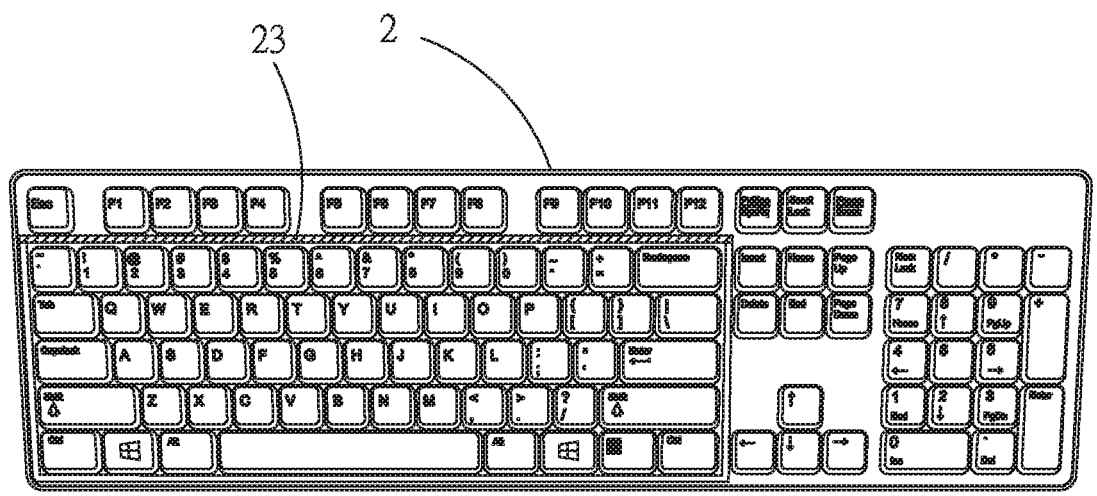
FIG. 12 is a tenth schematic diagram showing the implementation of the audio information processing method of the present invention.
Figure 13:
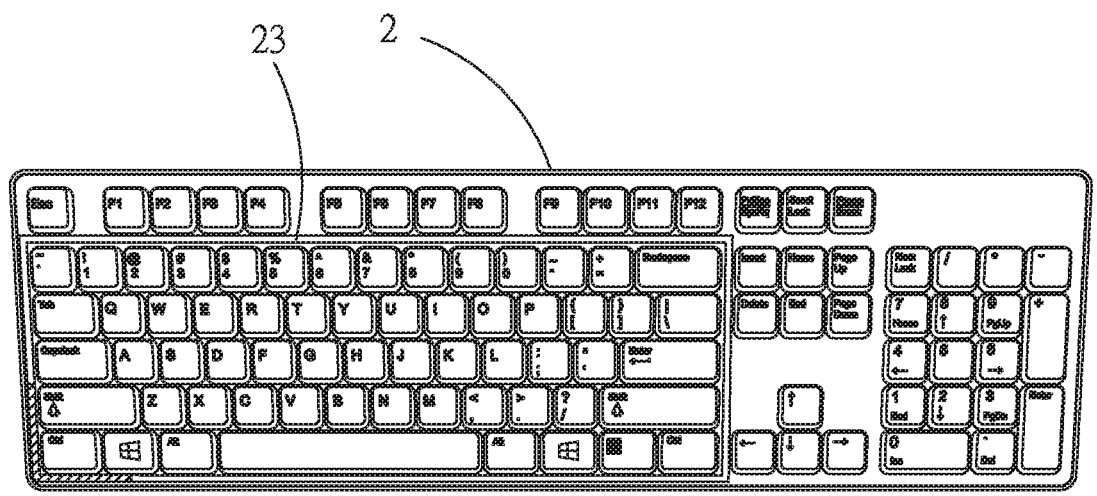
FIG. 13 is an eleventh schematic diagram of the implementation of the audio information processing method of the present invention

Referring to the foregoing drawings and FIGS. 12 and 13, which are tenth and eleventh schematic diagrams of the implementation of the audio information processing method of the present invention. The peripheral device 2 is implemented by using a keyboard. The light-emitting units 23 are disposed at positions on the upper surface of the keyboard, and the light-emitting units 23 are implemented as a looped light strip. The position identification signal S3 received by the processing unit 211 generates the control signal S4 according to the enemy's orientation. If the enemy's orientation is in front of the user, the light-emitting units 23 of the upper horizontal row will be correspondingly lit or blinked. Contrarily, if the enemy's orientation is at the left of the user, the light-emitting units 23 of the left vertical row will be correspondingly lit or blinked. If the enemy's orientation is behind the user, the light-emitting units 23 of the lower horizontal row will be correspondingly lit or blinked. If the enemy's orientation is at the right of the user, the light-emitting units 23 of the right vertical row will be correspondingly lit or blinked. If the enemy's orientation is at the rear left of the user, the light-emitting units 23 at the lower left corner will be correspondingly lit or blinked. In the figures, the front and rear left are implemented as the embodiments, and so on. If the enemy's orientation is in the user's orientation, the distinguished corresponding key will be lit or blinked, thus achieving the effect of quickly identifying the enemy's orientation by the user through the display of the light source, and the defined keys are not limited thereto, and any methods for distinguishing the orientations by mainly using the positions of the keyboard are within the scope protected by the present invention.

Figure 14:
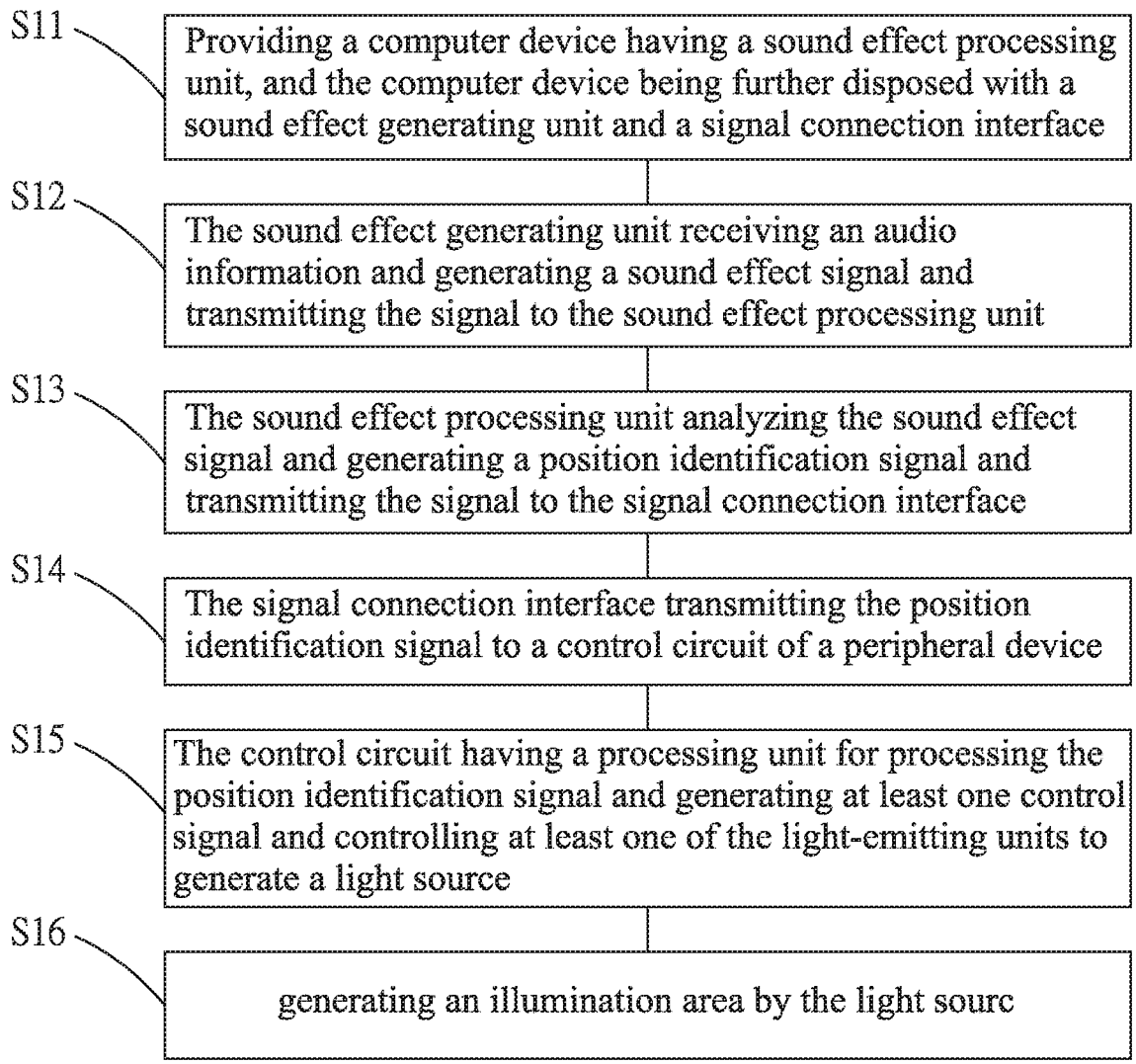
FIG. 14 is a second flow chart of the audio information processing method of the present invention.
Figure 15:
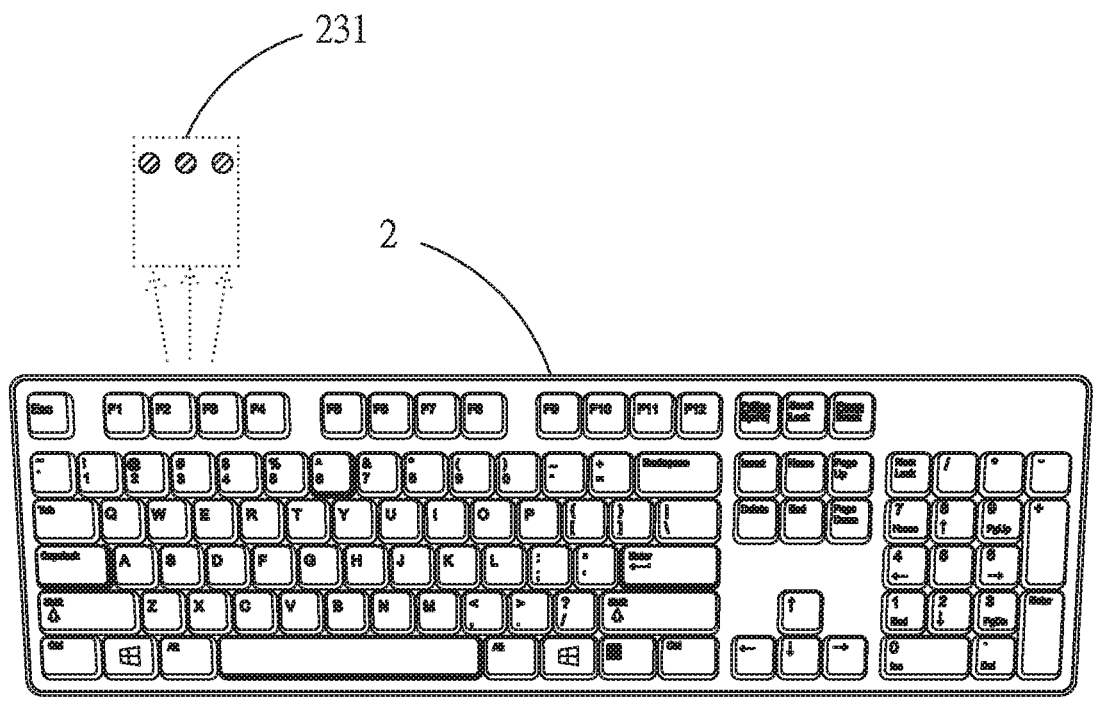
FIG. 15 is a twelfth schematic diagram of the implementation of the audio information processing method of the present invention.
Figure 16:
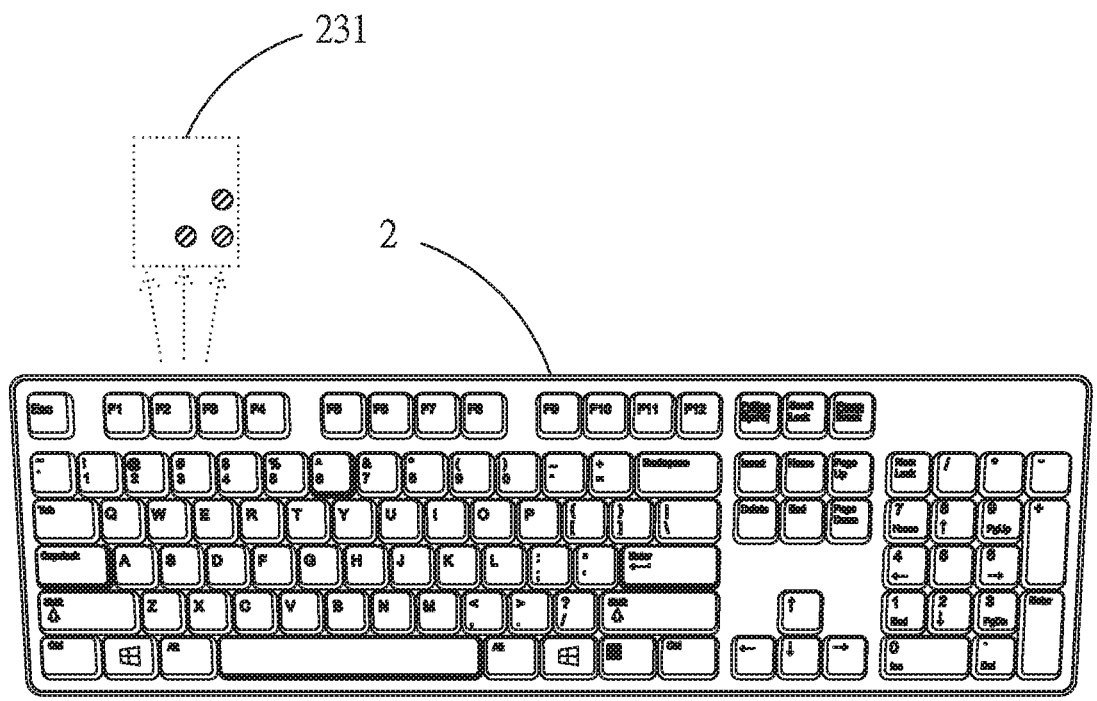
FIG. 16 is a thirteenth schematic diagram of the implementation of the audio information processing method of the present invention.

Please refer to the foregoing drawings and FIGS. 14 and 15 and 16, which are second flow chart as well as twelfth and thirteenth schematic diagrams of the audio information processing method of the present invention, the audio signal processing method further comprising:

step S16: generating an illumination area by the light source; the light source generated by the light-emitting units 23 being capable of illuminating light and generating an illumination area 231, wherein the peripheral device 2 is implemented by using a keyboard, the light-emitting units 23 are disposed under the keyboard keys, and the position identification signal S3 received by the processing unit 211 generates the control signal S4 according to the enemy's orientation, the processing unit 211 controls the light-emitting units 23 to generate the light source via the control signal S4, the illumination area 231 is formed by the light illuminated by the light source, the illumination area 231 can be implemented by eight light beams as an embodiment, and the area displayed by the illumination area 231 is the corresponding position of the enemy's orientation. If the enemy's orientation is in front of the user, the light-emitting units 23 illuminate three upper light beams to form the illumination area 231. Conversely, if the enemy's orientation is at the left of the user, the light-emitting units 23 illuminate three left light beams and form the illumination area 231. If the enemy's orientation is behind the user, the light-emitting units 23 illuminate three lower light beams and form the illumination area 231. Oppositely, if the enemy's orientation is at the right of the user, the light-emitting units 23 illuminate three right light beams and form the illumination area 231. In the figure, the front is implemented as the embodiment, and so on. If the enemy's orientation is at the front left or the rear left or the front right or the rear right of the user, the light-emitting units 23 illuminate three front left or rear left or front right or rear right light beams and form the illumination area 231. In the figure, the rear right is implemented as the embodiment. Thereby achieving the effect of quickly identifying the enemy's orientation by the user through the display of the light source, and the defined light-emitting units 23 are not limited thereto, and any methods for distinguishing the orientations by mainly using the position of the illumination area 231 of the light-emitting units 23 are within the scope protected by the present invention.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. An audio information processing method, comprising:
   providing a computer device having a sound effect processing unit, and the computer device being further disposed with a sound effect generating unit and a signal connection interface;
   the sound effect generating unit receiving an audio information and generating a sound effect signal and transmitting the signal to the sound effect processing unit;
   the sound effect processing unit analyzing the sound effect signal and generating a position identification signal and transmitting the signal to the signal connection interface;
   the signal connection interface transmitting the position identification signal to a control circuit of a peripheral device; and
   the control circuit having a processing unit for processing the position identification signal and generating at least one control signal and controlling at least one light-emitting unit to generate a light source.

2. The audio information processing method as claimed in claim 1, wherein the computer device has at least one game software therein, and the computer device executes the game software to generate the audio information.

3. The audio information processing method as claimed in claim 1, wherein the peripheral device further has a signal transmission interface, the signal transmission interface is electrically connected to the control circuit, and the control circuit is electrically connected to the signal connection interface via the signal transmission interface.

4. The audio information processing method as claimed in claim 3, wherein the signal connection interface is a wired interface of the universal serial bus (USB), and the signal transmission interface is a wired interface of a USB transmission line.

5. The audio information processing method as claimed in claim 3, wherein the signal transmission interface and the signal connection interface are wireless interfaces of Wi-Fi, Bluetooth, infrared antenna or other transmission protocols.

6. The audio information processing method as claimed in claim 1, wherein the peripheral device is a keyboard, a mouse or a game controller.

7. The audio information processing method as claimed in claim 1, further comprising a step of: generating an illumination area by the light source.

\* \* \* \* \*